United States Patent Office 3,758,495
Patented Sept. 11, 1973

3,758,495
STABLE FREE RADICALS AND CORRESPONDING FREE RADICAL PRECURSORS
Rein Virkhaus, Rochester, N.Y., assignor to Eastman Kodak Company, Rochester, N.Y.
No Drawing. Continuation-in-part of application Ser. No. 95,331, Dec. 4, 1970. This application Feb. 25, 1971, Ser. No. 119,052
Int. Cl. C07d 49/34
U.S. Cl. 260—309.6       10 Claims

ABSTRACT OF THE DISCLOSURE

The preparation of certain novel aminoaryl-substituted 1-oxyl-3-oxide-2-imidazoline free radicals and the corresponding 1,3-dihydroxy-tetrahydroimidazole stable free radical precursors, useful in direct positive or negative image-forming systems, and methods for their preparation are disclosed.

This application is a continuation-in-part of U.S. Ser. No. 95,331, filed Dec. 4, 1970, now abandoned.

FIELD OF THE INVENTION

The present invention relates to certain novel stable imidazole free radicals and their corresponding free radical precursors, useful in direct imaging photographic systems, and to methods for the preparation of same.

PRIOR ART

In the prior art, a number of imidazole compounds have been prepared. The classical synthesis of imidazoles involves condensation of glyoxal with ammonia either with or without added aldehydes. The formation of 2-alkyl and 2-alkenyl imidazolines by condensation of acetylated ethylene diamine in the presence of dehydrating agents is described in U.S. Pats. 2,399,601 and 2,404,299. The obtained 2-alkyl imidazolines are converted to the corresponding imidazole compounds by dehydrogenation over a nickel catalyst.

More recently there was disclosed in U.S. Pat. No. 2,847,417 a process for direct preparation of imidazoles and specifically 2-hydrocarbon substituted imidazoles by reaction of an alkylene polyamide with a carboxylic acid, ester or anhydride, over a solid dehydrocyclization catalyst, as for example, a supported platinum catalyst.

Still more recently the patent literature, in U.S. Pat. No. 3,037,028, disclosed a method for preparing imidazole compounds of the formula:

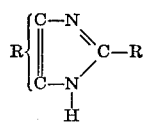

by the reaction of an alkylene diamine having vicinal amino groups with a primary alcohol or its corresponding oxidation product in the form of an aldehyde; by effecting reaction in the vapor phase over a solid dehydrogenation catalyst capable of sorbing water released in the reaction.

The following technical literature references have also disclosed the preparation of the indicated imidazoles.

(A) Osiecki and Ullman, JACS 90, 1070 (1968), "Studies of Free Radicals." This communication states that: "On treatment of the previously known 2,3-bis-(hydroxylamino)-2,3-dimethylbutane (I) with benzaldehyde in benzene solution at room temperature, a product was obtained in 74% yield that was identified as 1,3-dihydroxy-4,4,5,5 - tetramethyl - 2 - phenyl - tetrahydroimidazole (II) . . ."

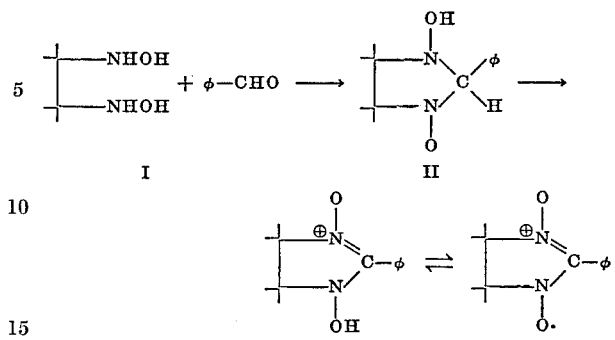

(B) D. G. B. Boocock, R. Darcy and E. F. Ullman, JACS 90 (21), 5945 (1968). "Studies of Free Radicals. (II) Chemical Properties of Nitronylnitroxides. A unique Radical Anion." This article describes the preparation of alkylnitronylnitroxides of the following generic formula:

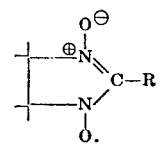

where R=CH$_3$, —CH$_2$CH$_3$, —(CH$_2$)$_{12}$CH$_3$, —CH$_2$OH, —CH(CH$_3$)$_2$, —CH(OC$_2$H$_5$)$_2$.

(C) D. G. B. Boocock and E. F. Ullman, JACS 90 (24) 6873 (1968) "A 1,3-dioxy-2-imidazolidone Zwitterion and its Stable Nitronyl Nitroxide Radical Anion." This article describes the preparations of the following class of compounds

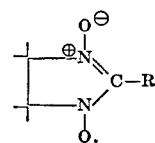

Where R=I, —Br, —cl., —CN, —O$^\ominus$,

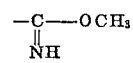

(D) E. F. Ullman and R. Darcy, JACS 91 (4), 1024 (1969). "The origin of Asymmetry and Rate of Symmetrization of a Spin-Label Alpha-Sulfonyl Carbanion." This communication describes the preparation of the following compounds:

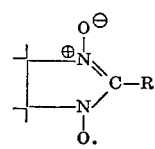

Where R=—CH$_2$Cl, —CH$_2$SO$_2$—$\phi$, —CH=CH—$\phi$, —CH$_2$SO$_2$—$\phi$, (E) Kreilich, Becker and Ullman, JACS 91 (18), 5121 (1969). "Electron Spin Resonance Studies of Nitronyl-nitroxide Radicals With Asymmetric Centers," which describes the preparation of the following compounds:

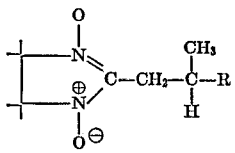

Where

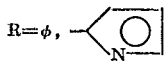

(F) Balaban et al., Chem. and Ind. 651 (May 18, 1968). "Stable Radicals from 1-Hydroxybenzimidazole-3-oxides."

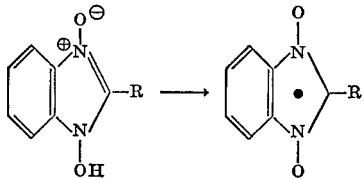

Where R=—CH₃, —φ

(G) Volkamer et al., Angew Chem. Int. Ed. 6 (11), 947 (1967), "N-oxides of Imidazoles"

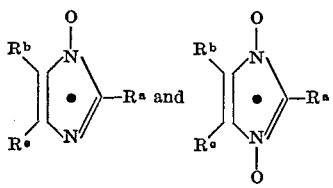

Where

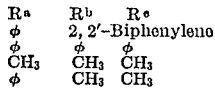

| Rᵃ | Rᵇ | Rᶜ |
|----|----|----|
| φ  | 2, 2'-Biphenylene | |
| φ  | φ  | φ  |
| CH₃ | CH₃ | CH₃ |
| φ  | CH₃ | CH₃ |

(H) L. B. Volodarsky and G. A. Kutikova, "A Route to Stabilize Nitroxide Radicals of Imidazoline N-oxide," Tetrahedron Letters No. 9, Pergamon Press, Great Britain, pp. 1065–1968 (1968). This article describes the free radical.

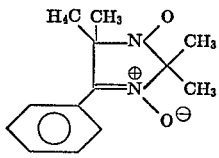

SUMMARY OF THE INVENTION

The present invention relates to the preparation of certain novel aminoaryl-substituted 1-oxyl-3-oxide-2-imidazoline stable free radicals and the corresponding 1,3-dihydroxy stable free radical precursors. The novel aminoaryl substituted free radicals and free radical precursors of my invention are useful in photographic systems comprising a negative-working, image-forming element containing a combination of a stable free radical precursor and at least one additional, photosensitive compound which is activated by light causing it to react with the free radical precursor and produce a colored, stable free radical in the exposed areas as described and shown hereinafter.

DETAILED DESCRIPTION OF THE INVENTION

The stable free radicals and free radical precursors described herein are defined by the following generic formulas:

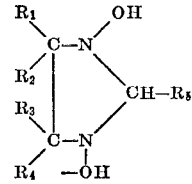

Stable Free Radical Precursor

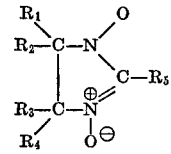

Stable Free Radical wherein:
(a) each of R¹, R², R³ and R⁴ independently represents one of an alkyl group, an alkoxy group or an aryl group, and
(b) R⁵ represents an aminoaryl group having from 6 to 14 atoms in a mono- or polycyclic aromatic nucleus, with the amino group having the formula

wherein each of R⁶ and R⁷ independently represents one of an alkyl group or an aryl group (preferably phenyl). In one preferred embodiment, R⁶ and R⁷ are alike.

As used herein, the term alkyl group includes straight or branched chain aliphatic groups having from 1 to 8 carbon atoms in the carbon chain used to define the group nomenclature, such as methyl, ethyl, 2-chloroethyl, isopropyl, butyl, pentyl, heptyl, n-octyl, 7-methyloctyl and the like alkyl groups. Lower alkyl groups having 1–4 carbon atoms are preferred. The term alkoxy group refers to etherified alkyl groups, also designated alkyloxide groups, and include an alkyl moiety such as those described herein chemically bonded to an oxygen atom, for example, methoxy, ethoxy, propoxy, isobutoxy, pentyloxy, n-octyloxy, etc. Lower alkoxy groups having from 1 to 4 carbon atoms are preferred. The term aryl group, as used herein, refers to and includes aromatic groups derived from mono- and polycyclic carbocyclic nuclei and having from 6 to 14 atoms in a mono- or polycyclic nucleus, such as phenyl, p-tolyl, naphthyl, anthryl, etc.

The free radical precursors of the present invention are generally prepared by the reaction of an ortho bis(hydroxylamino)alkane with an appropriate arylamino benzaldehyde in an organic solvent using the general method of prior art reference (A) above. That reference is incorporated herein by reference. Depending on the particular substituents represented by R¹, R², R³ and R⁴, the ortho bis(hydroxylamino)alkane can be substituted with alkyl, alkoxy or aryl groups. As an example, when each of R¹, R², R³ and R⁴ is methyl radical, the alkane is 2,3-bis(hydroxylamino)-2,3-dimethylbutane. Other precursors useful in preparing the stable free radical precursors and stable free radicals of this invention include such compounds as 2,3-bis(hydoxylamino)-2,3-diphenylbutane, 2,3-bis(hydroxylamino)2,3-dimethoxybutane, etc.

The stable free radical derivatives of these compounds are prepared by treatment of the stable free radical precursor prepared as described above with a suitable oxidation catalyst, fo example, active lead dioxide in benzene solution or any other similar oxidation catalyst well known to those skilled in the art.

The following examples will serve to better illustrate the novel stable free radicals, and the stable free radical precursors described herein as well as to indicate their usefulness in photographic systems of the type described above.

Example 1

The synthesis of 1,3-dihydroxy-4,4,5,5-tetramethyl-2-(p-diphenylamino-phenyl)tetrahydroimidazole:

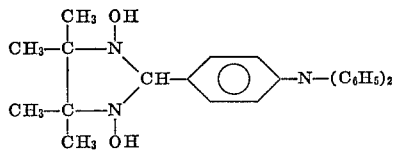

(I)

is performed as follows: a solution of 5.0 g. (0.0379 mole) of 2,3-bis(hydroxylamino)-2,3-dimethylbutane and 10.4 g. (0.0379 mole) of p-diphenylamino-benzaldehyde in 50 ml. of benzene is magnetically stirred and refluxed for 20 hours. After cooling, the precipitate is collected and washed with benzene to yield 10.0 g. of yellow powder (I), M.P. 170–190° C. IR: No >C=O absorption.

Example 2

Synthesis of 4,4,5,5 - tetramethyl-2-(p-diphenylamino-phenyl)-2-imidazoline-1-oxyl-3-oxide:

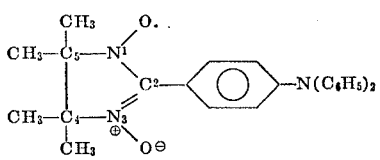

(II)

is performed as follows: to a benzene (50 ml.) solution of 7.0 g. (0.018 mole) of I (described above) is added 5.5 g. (0.023 mole) of freshly prepared active lead dioxide. An intense blue color appears. The dispersion is stirred at reflux under argon atmosphere for 18 hours. After filtration of a tan solid (5.18 g.), the blue-black benzene solution is evaporated leaving 6.14 g. of dull blue solid. Recrystallization from ligroin (B.P. 100–115° C.) gives 4.22 g. of intensely blue needles, M.P.: 180–185° corr. An analytical sample, M.P.: 187.5–188.5° corr., is obtained after 2 more recrystallizations from ligroin (B.P. 100–115° C.).

Calc'd (percent): C, 74.97; H, 6.54; N, 10.49. Found (percent): C, 75.00; H, 6.50; N, 10.70.

The structure is proved by the mass spectrum peaks at m./e. 400, 384, 312, 272, 271, 270 and 84. Evaporation of the ligroin solution leaves about 1.3 g. of deep red-purple solid, M.P.: 130–142°. Recrystallization from ligroin (B.P. 100–115°) raises the M.P. to 150–155°.

Example 3

Synthesis of 1,3-dihydroxy-4,4,5,5-tetramethyl-2-(p-dimethylaminophenyl)tetrahydroimidazole (III):

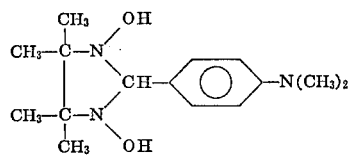

III is performed as follows: a solution tof 5.0 g. (0.0379 mole) of 2,3-bis(hydroxylamino) - 2,3 - dimethyl-butane and 5.65 (0.0379 mole) of p-dimethylaminobenzaldehyde is stirred at reflux for 20 hours. The product is collected as an off-white powder and was washed with ether to yield 5.45 g. of solid III, M.P. 160–190° C. The IR spectrum shows no >C=O absorption.

Example 4

Synthesis of 4,4,5,5 - tetramethyl-2-(p-diphenylamino-phenyl)-2-imidazoline-1-oxyl-3-oxide:

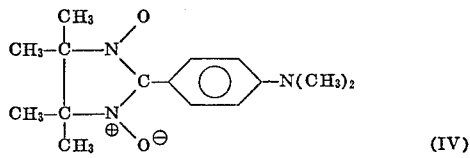

(IV)

is performed as follows: to a solution of 4.0 g. (0.0143 mole) of III in benzene is added 4.78 (0.02 mole) of freshly prepared active lead dioxide. An intense green-blue color appears. The dispersion is stirred at reflux under argon atmosphere for 20 hours. After filtration of a tan solid (5 g.), the benzene solution is evaporated to yield 3.92 g. of blue-black solid. Recrystallization from ligroin (B.P. 100–115°) gives blue-black needles, M.P.: 147–149°.

Analysis.—Calc'd (percent): C, 65.19; H, 8.0; N, 15.2. Found (percent) C, 65.10; H, 8.3; N, 15.1.

Structure proven by mass spectrum peaks at 276, 260, 188, 162, 161, 148, 147, 146 and 84.

Example 5

Synthesis of 1,3-dihydroxy-4,4,5,5-tetramethyl-2-(p-diethylaminophenyl)-tetrahydroimilazole (V)

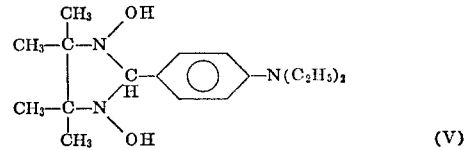

(V)

is performed as follows: a benzene solution of 5.0 g. (0.0379 mole) of 2,3-bis(hydroxylamino)-2,3-dimethylbutane and 6.7 g. (0.0379 mole) of p-diethylaminobenzaldehyde is stirred at reflux for 20 hours. The precipitate is collected, washed with ether and air dried to yield 5.45 g. of light yellow powder, M.P.: 176–187° C. No >C=O absorption present in the I.R. spectrum.

Example 6

Synthesis of 4,4,5,5 - tetramethyl - 2(p-diethylamino-phenyl)-2-imidazoline-1-oxyl-3-oxide:

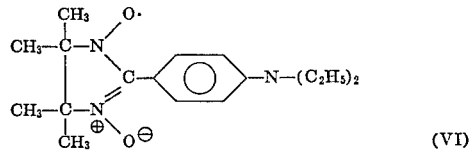

(VI)

is performed as follows: to a solution of 4.0 g. (0.013 mole) of V (described above) is added 4.78 g. (0.02 mole) of freshly prepared lead dioxide. A blue-green color appears. The mixture is stirred at reflux for 20 hours. After filtration of a tan solid (4.6 g.), the deep purple benzene solution is evaporated to yield 2.6 g. of purple-blue solid. Treatment with boiling ligroin (B.P. 100–115° C.) allows isolation of VI as an insoluble deep blue-black crystal, M.P.: 144–145° C. (corr.).

Analysis.—Calc'd (percent): C, 67.1; H, 8.6; N, 13.8. Found (percent): C, 67.3; H, 8.4; N, 13.5.

Structure is proven by mass spectrum peaks at 304, 289, 288, 273, 258, 216, 176, 175, 174, 159, 131 and 84. Further fractional crystallization from ligroin (B.P. 100–115°) gives a bright purple solid, M.P.: 112.5–116° C. The mass spectrum indicates that this might be

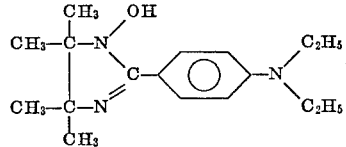

The foregoing examples demonstrate the preparation of stable free radical precursors and free radicals in accordance with the present invention. Other free radical precursors, from which the corresponding free radicals can be prepared by the described procedure, include such imidazole compounds as 1,3-dihydroxy-4,4,5,5-tetraethyl-2(4'-diethylamino-naphthyl)tetrahydroimidazole and
1,3-dihydroxy-4,4,5,5-tetramethyl-2(4'-diphenylamino-naphthyl)tetrahydroimidazole.

These free radical precursors are also prepared by methods such as those described herein.

The following Examples 7-10 demonstrate the usefulness of these compounds in negative-working image-forming elements containing a combination of a stable free radical precursor and at least one additional photosensitive compound which is activated by light causing it to react with the free radical precursor to produce a colored, stable free radical in the exposed areas, as well as in direct positive imaging systems wherein the photographic element comprises a colored stable free radical and at least one photobleachant which when exposed to actinic radiation bleaches in the exposed areas to the extent that the exposed areas exhibit less density than the unexposed areas thus resulting in a direct positive of the original.

Example 7

A dope is prepared by dissolving 0.13 g. of 1,2'-bis-(2-o-chlorophenyl-4,5-diphenylimidazole) as the photoactivator and 0.04 g. of 1,3-dihydroxy-4,4,5,5-tetramethyl-2-(p-dimethylaminophenyl)tetrahydroimidazole plus 2 g. of cellulose acetate butyrate as a binder in 5 ml. of 2-methoxyethanol and 15 ml. of methylene chloride. The dope is coated on a paper support at a wet thickness of 0.005 inch. When dry, a portion of the coating is imagewise exposed to the ultraviolet rich rays of a mercury vapor lamp. The coating changes from off white to blue in the exposed areas, but remains unchanged in the unexposed areas.

Example 8

A dope is prepared by dissolving 0.03 g. of 1-oxyl-2-[4-dimethylaminophenyl] - 4,4,5,5 - tetramethyldihydroimidazole-3-oxide, 0.131 g. of 4-diethylaminobenzenediazonium chlorozincate as the photobleachant and 10 g. of cellulose acetate butyrate, as a binder, in 25 mls. of 2-methoxyethanol plus 75 mls. of methylene chloride. The dope is coated on a paper support at a wet thickness of 0.005 inch. When dry, a portion of the coating is exposed as in Example 7. The coating bleaches in the exposed areas but remains unchanged in the unexposed areas. The color change is from blue to colorless.

Example 9

The procedure of Example 8 is followed except that the 1-oxyl-2-[4-dimethylaminophenyl]-4,4,5,5-tetramethyldihydroimidazole - 3 - oxide is replaced by 0.03 g. of 1-oxyl-2-[4-diethylaminophenyl] - 4,4,5,5 - tetramethyldihydroimidazole-3-oxide. The coating bleaches in the exposed areas, but remains unchanged in the unexposed areas. Color change is from blue to colorless.

Example 10

The procedure of Example 8 is followed except that the 1-oxyl-2-[4-dimethylaminophenyl]-4,4,5,5-tetramethyldihydroimidazole-3-oxide is replaced by 0.025 g. of 1-oxyl-2-phenyl - 4,4,5,5 - tetramethyldihydroimidazole-3-oxide. The coating bleaches in the exposed areas but remains unchanged in the unexposed areas. Color change is from blue to colorless.

From the aforegoing, it should be clear that the above-described stable free radicals and their precursors find use in direct negative and positive photographic systems of the type described.

The invention has been described in detail with particular reference to certain preferred embodiments thereof, but it will be understood that variations and modifications can be effected within the spirit and scope of the invention.

There is claimed:

1. As a composition of matter, stable free radical precursors having the formula

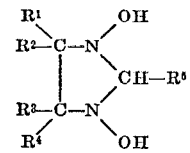

wherein:

(a) each of $R^1$, $R^2$, $R^3$ and $R^4$ independently represents one of an alkyl group having from 1 to 8 carbon atoms in the carbon chain used to define the group nomenclature, an alkoxy group having from 1 to 8 carbon atoms or an aryl group having from 6 to 14 carbon atoms, and (b) $R^5$ represents an aminoaryl group having from 6 to 14 atoms in a mono- or polycyclic aromatic nucleus, said amino group having the formula

$R^6$ and $R^7$ each representing independently one of an alkyl group having from 1 to 8 carbon atoms in the carbon chain used to define the group nomenclature or an aryl group having from 6 to 14 carbon atoms.

2. A composition of matter as described in claim 1 wherein each of $R^1$, $R^2$, $R^3$ and $R^4$ is a methyl group.

3. As a composition of matter, 1,3-dihydroxy-4,4,5,5-tetramethyl-2-(p - diphenylaminophenyl)tetrahydroimidazole.

4. As a composition of matter, 1,3-dihydroxy-4,4,5,5-tetramethyl - 2 - (p-dimethylaminophenyl)tetrahydroimidazole.

5. As a composition of matter, 1,3-dihydroxy-4,4,5,6-tetramethyl- 2 - (p - diethylaminophenyl)tetrahydroimidazole.

6. As a composition of matter, stable free radicals having the formula

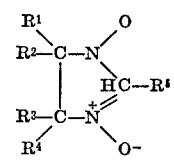

wherein:

(a) each of $R^1$, $R^2$, $R^3$ and $R^4$ independently represents one of an alkyl group having from 1 to 8 carbon atoms in the carbon chain used to define the group nomenclature, an alkoxy group having from 1 to 8 carbon atoms or an aryl group having from 6 to 14 carbon atoms, and (b) $R^5$ represents an aminoaryl group having from 6 to 14 atoms in a mono- or polycyclic aromatic nucleus, said amino group having the formula

$R^6$ and $R^7$ each representing independently one of an alkyl group having from 1 to 8 carbon atoms in the carbon chain used to define the group nomenclature or an aryl group having from 6 to 14 carbon atoms.

7. A composition of matter as described in claim 6 wherein each of $R^1$, $R^2$, $R^3$ and $R^4$ is a methyl group.

8. As a composition of matter 4,4,5,5-tetramethyl-2-(p-diphenylaminophenyl)-2-imidazoline-1-oxyl-3-oxide.

9. As a composition of matter, 4,4,5,5-tetramethyl-2-(p-dimethylaminophenyl)-2-imidazoline-1-oxyl-3-oxide.

10. As a composition of matter, 4,4,5,5-tetramethyl-2-(p-diethylaminophenyl)-2-imidazoline-1-oxyl-3-oxide.

References Cited

UNITED STATES PATENTS 3,127,266   3/1964   Sus et al. _____ 96—1

OTHER REFERENCES

Volkamer et al.: Angew. Chem. Internat. Edit., vol. 6, pp. 947–8 (1967).

Osiecki et al.: J. Am. Chem. Soc., vol. 90, pp. 1078 to 1079 (1968).

JOHN D. RANDOLPH, Primary Examiner

U.S. Cl. X.R.

96—88, 90 R; 260—309.7